United States Patent Office 2,949,424
Patented Aug. 16, 1960

2,949,424

CLATHRATES

Lyon Mandelcorn, Robert W. Auxier, and Charles W. Lewis, Pittsburgh, Pa., assignors to Westinghouse Electric Corporation, East Pittsburgh, Pa., a corporation of Pennsylvania No Drawing. Filed Sept. 17, 1956, Ser. No. 610,395

1 Claim. (Cl. 252—1)

The present invention relates to clathrates composed of a solid material containing a normally gaseous material present therein.

For numerous purposes, it has long been desirable to have available a solid material which contains a selected gas contained physically within the structure thereof such that upon the occurrence of a selected condition, such for example as, reaching a given elevated temperature, the gaseous material is evolved in substantial quantities therefrom. It is particularly desirable to have available relatively inert or unreactive gases in a solid form so that the gas may be handled and released under controlled conditions without requiring high pressure equipment.

A novel way to achieve this is to clathrate the gas within the crystal structure of a solid by arranging conditions such that the clathrating material is a liquid or is in solution while in the presence of the gas to be clathrated and allowing the clathrating agent to crystallize in the presence of the gas upon cooling.

The clathrating material during solidification forms a cage which encloses or traps the gaseous molecules in spaces which are regularly disposed components of its crystalline lattice. The entrapment is physical and dependent on the geometry of the trapped molecule and the space.

The object of the present invention is to provide a solid containing a gaseous material, and particularly an electronegative gas, in clathrated form.

A further object of the invention is to provide a process for producing clathrates comprising Dianin's compound containing a substantial amount of relatively inert, electronegative gas in clathrated form therein.

Other objects of the invention will, in part, be obvious and will, in part, appear hereinafter. For a better understanding of the nature and objects of the present invention, reference should be had to the following detailed description.

In accordance with the present invention, gaseous materials are clathrated in a clathrating solid thereby to provide a product which at room temperature is relatively inert and stable, but when heated to a predetermined elevated temperature the solid clathrate evolves substantial quantities of the gaseous materials. The process for producing such clathrates comprises dissolving a solid clathrating compound in a solvent which is capable of dissolving substantially more of the compound at elevated temperatures but the solvent itself comprises molecules too large or too small to be clathrated. The solution of the clathrating compound is substantially saturated at the elevated temperature. Into the solution a selected gas to be clathrated is introduced at a selected pressure. The solution is cooled, while the gas pressure is maintained whereby the solid compound recrystallizes and precipitates from solution, the precipitated crystals containing the gas in clathrated form therein. The precipitated crystals can then be separated from the solvent. The resulting clathrate crystals can then be employed in any suitable manner to provide a supply of gas which will be evolved either upon heating the solid clathrate to a temperature near the melting point of the solid compound or by dissolving the solid in a solvent. At or near the melting point the gas will evolve readily.

It has been found that Dianin's compound forms an exceptionally satisfactory clathrating solid for the purpose of this invention. The preparation of Dianin's compound is set forth in Journal Soc. Phys. Chem., Russe, 46, 1310 (1914). Dianin's compound may be prepared by reacting mesityl oxide with phenol in the proportions of two moles of phenol per mole of the mesityl oxide. The mixture of the mesityl oxide and phenol is treated with dry hydrogen chloride gas for several hours and then the reaction mixture is allowed to stand for from two to ten days. During this period hydrogen chloride is evolved from the reaction mixture. However, an excess of the hydrogen chloride is ordinarily employed. The resulting reaction product is steam distilled and then washed with hot water until a solid mass results. The solid mass is then recrystallized from 95% ethanol which results in a white crystalline mass melting from a temperature of 163° C. to 165° C. This product is identified as the ethanol clathrate of Dianin's compound. Dianin's compound itself as the formula $C_{18}H_{20}O_2$.

In order to clathrate a selected gas, the ethanol clathrate is dissolved in a solvent which does not form a clathrate with the solid. Numerous organic liquid compounds are suitable for this purpose. Best results are obtained if the solvent is one in which the gas dissolves readily. Thus, liquid long chain alcohols and liquid polynuclear aromatic compounds are excellent solvents therefor. Specific examples of such suitable solvents are decanol, dodecanol, tetrahydronaphthalene and decahydronaphthalene. These solvents have molecules which are not readily clathrated by the compound. The solution is saturated with the solid Dianin's compound at an elevated temperature not in excess of approximately 140° C. Alcohol vapors are evolved from the hot solution, and are withdrawn by pumping, if desired. In order to introduce the gas to be clathrated into the solution, it is ordinarily desirable to apply the selected gas under pressure to the solution. This may be accomplished in an autoclave containing the hot saturated solution of the clathrating compound in which the selected gas is maintained at a selected pressure. The solution in the autoclave is then cooled while maintaining the gas under pressure, whereby during cooling crystals of the compound precipitates from the solution. The crystals contain the gas in clathrated form. The crystals can be separated from the cooled solution and may be washed to remove the solvent therefrom, the crystals ordinarily are of the fineness of granulated sugar. However, by controlling the rate of cooling, larger or smaller crystals may be obtained, as desired. The crystals can be crushed with only a slight loss of the clathrated gas therefrom.

Numerous gases may be clathrated in accordance with the present invention. Thus, nitrogen, hydrocarbons such as ethylene and propylene, and electronegative gases, particularly chlorine compounds such as dichlorodifluoromethane, and even carbon tetrachloride which is gaseous when added to and evolved from the clathrate, and fluorine compounds may be clathrated. Particularly useful clathrated products are obtained with fluorine-containing electronegative gases. Examples of such last-mentioned fluorine compounds are sulfur hexafluoride, selenium hexafluoride, and trifluoromethyl sulfur pentafluoride. Likewise, fluorocarbons such as perfluorobutane and perfluorohexane can be clathrated. The fluorinated and other electronegative gases are particularly suitable when in clathrate form for use in switchgear and circuit breakers. The solid clathrates containing these compounds may be disposed near arcing contacts so that the heat developed by the electrical arc will decompose the clathrate and release copious quantities of the electronegative gas which will assist in interrupting the electrical arc. The clathrate solids may be adhesively coated on the breaker walls to provide a layer thereof near the arcing contacts.

The clathrated solids may be incorporated in various resins, inorganic cements and other binders or products from which it may be desirable to evolve a selected gas.

The following examples illustrate the practice of the invention:

*Example I*

The ethanol clathrate of Dianin's compound was dissolved in decahydronaphthalene at a temperature of 90° C., there being sufficient of the compound (approximately 50% by weight) to saturate the solution at this temperature. After the ethanol vapors had been completely withdrawn, the hot solution was placed in an autoclave, and sulfur hexafluoride at a pressure of 350 pounds per square inch was admitted to the autoclave. The contents of the autoclave were then agitated and cooled to room temperature (25° C.) to cause the compound to crystallize out of solution. A quantity of fine white crystals precipitated from the solution during the cooling. The pressure of the sulfur hexafluoride was maintained during the entire operation. The white crystals were freed from the solvent. They were similar in appearance to granulated sugar. A quantity of the resulting clathrate crystals was heated to a temperature of 165° C. Sulfur hexafluoride in an amount equal to 7½% of the weight of the crystals was released. In this case the empirical formula of the clathrate was $nC_{18}H_{20}O_2 \cdot SF_6$ where $n$ has an approximate value of 7.

*Example II*

The process of Example I was repeated using dodecanol as the solvent and nitrogen gas at atmospheric pressure was employed instead of sulfur hexafluoride. The final product was found to contain a proportion of nitrogen gas clathrated therein.

*Example III*

The process of Example I was repeated except that the solvent used was dodecanol and the sulfur hexafluoride gas was maintained at a pressure of one atmopshere. The quantity of sulfur hexafluoride clathrated in this experiment, was about 1.4 times that in Example I.

Two or more gases may be clathrated simultaneously. Thus, the process of Example I may be carried out by employing a mixture of sulfur hexafluoride and trifluoromethyl sulfur pentafluoride. The resulting clathrate will contain both gases in substantially the same proportions as in the mixture of gases applied to the autoclave.

It will be understood that the above description is illustrative only, and not in limitation.

We claim as our invention:

A clathrate comprising crystals of Dianin's compound and at least one electronegative gas contained therein, the gas having fluorine atoms in the molecule and being selected from the group consisting of sulfur hexafluoride, selenium hexafluoride and trifluoromethyl sulfur pentafluoride.

References Cited in the file of this patent

Powell: Jour. Chem. Soc. (London), 1948, pp. 61–73.
Science New Letter, May 19, 1951, p. 309.
Kobe et al.: Petroleum Refiner, Part 1, vol. 31, March 1952, pp. 106–113.
Truter: Research (London), vol. 6, 1953, pp. 320–326.
"Chemistry and Industry" (London), March 5, 1955, pp. 256–257, articles by Baker et al. and Powell et al.